United States Patent
Wu (10) Patent No.: US 6,542,210 B1
(45) Date of Patent: Apr. 1, 2003

(54) STRUCTURE OF LIQUID CRYSTAL DISPLAY

(75) Inventor: Yung-Hsun Wu, Taipei Hsien (TW)

(73) Assignee: Au Optronics Corp., Hsinchu (TW)

( * ) Notice: Subject to any disclaimer, the term of this patent is extended or adjusted under 35 U.S.C. 154(b) by 95 days.

(21) Appl. No.: 09/685,942

(22) Filed: Oct. 10, 2000

(30) Foreign Application Priority Data

Sep. 15, 2000 (TW) .......................................... 89118903 A (51) Int. Cl.[7] .............................................. G02F 1/1335
(52) U.S. Cl. ........................................ 349/119; 349/102
(58) Field of Search ................................ 349/117, 119, 349/118, 121, 122, 102, 96

(56) References Cited

U.S. PATENT DOCUMENTS

| | | | | |
|---|---|---|---|---|
| 5,583,679 A | * | 12/1996 | Ito et al. ...................... | 349/118 |
| 5,594,568 A | * | 1/1997 | Abileah et al. ............. | 349/120 |
| 6,057,901 A | * | 5/2000 | Xu .............................. | 349/121 |
| 6,208,396 B1 | * | 3/2001 | Shimizu et al. ............. | 349/119 |

* cited by examiner

Primary Examiner—Robert H. Kim
Assistant Examiner—Thoi V Duong
(74) Attorney, Agent, or Firm—J. C. Patents (57) ABSTRACT

The invention is directed to a structure of LCD, having a first polarizer with a first polarization direction along a first angle. A first retardation phase plate is located behind the first polarizer. The first retardation phase plate is used to produce a retardation effect. The retardation direction is the same as the first angle. A first WV film is behind the first retardation phase plate. The WV film is operated along a second angle vertical to the first angle. A liquid crystal layer is located behind the WV film 110. The crystal rubbing direction of the liquid crystal layer is along the second direction. A second WV film is behind the liquid crystal layer. The second WV film is operated along the first angle. A second retardation phase plate is located behind the second WV film. The retardation direction of the second retardation phase plate is along the second angle. A second polarizer is located behind the second retardation phase plate. The polarization direction of the second polarizer is along the second angle.

5 Claims, 6 Drawing Sheets

STRUCTURE OF LIQUID CRYSTAL DISPLAY

CROSS-REFERENCE TO RELATED APPLICATION

This application claims the priority benefit of Taiwan application serial no. 89118903, filed Sep. 15, 2000.

BACKGROUND OF THE INVENTION

1. Field of Invention

The present invention relates to liquid crystal display device. More particularly, the present invention relates to a structure of a liquid crystal display.

2. Description of Related Art

Displaying device is very common in the daily life. Especially, a displaying device cannot be absent in a television set or a computer system, where the displaying device is used to display image to the user. In general, if the displaying device is designed by the cathode-ray tube (CRT) manner, it occupies a large space, causing inconvenient use. For example, a notebook cannot be equipped with a CRT display. In these considerations, a panel displaying device with matrix of pixels is successfully developed. The panel displaying device includes, for example, a liquid crystal display (LCD), or a thin film transistor (TFT) liquid crystal display (TFT-LCD).

Figure 1A:
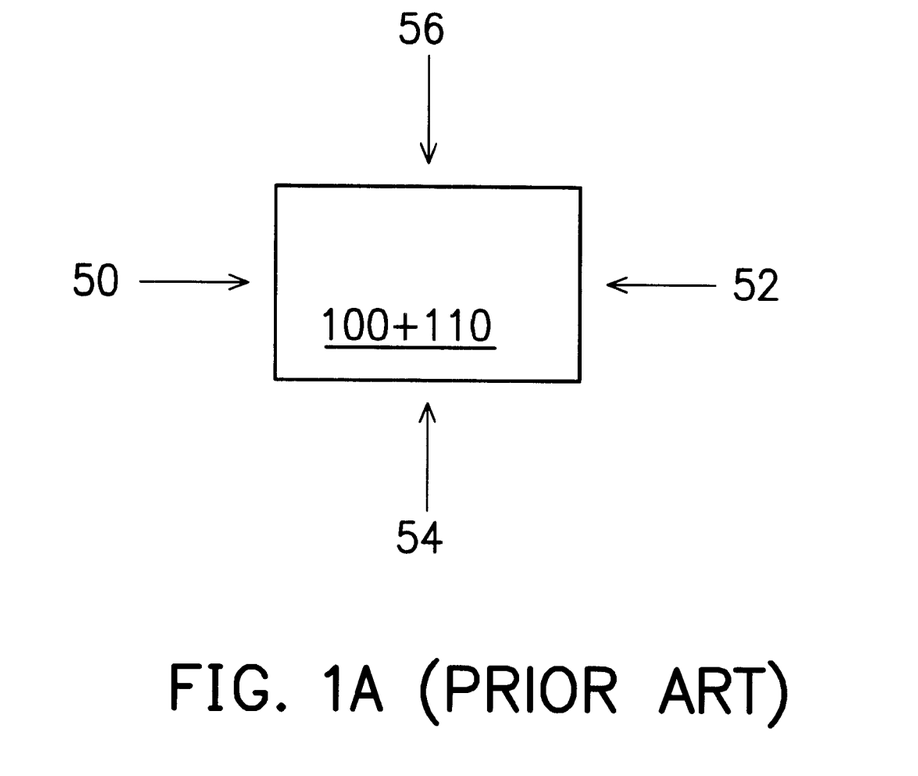
FIG. 1A is a top view, schematically a typical relation between the view angle and the LCD.
Figure 1B:
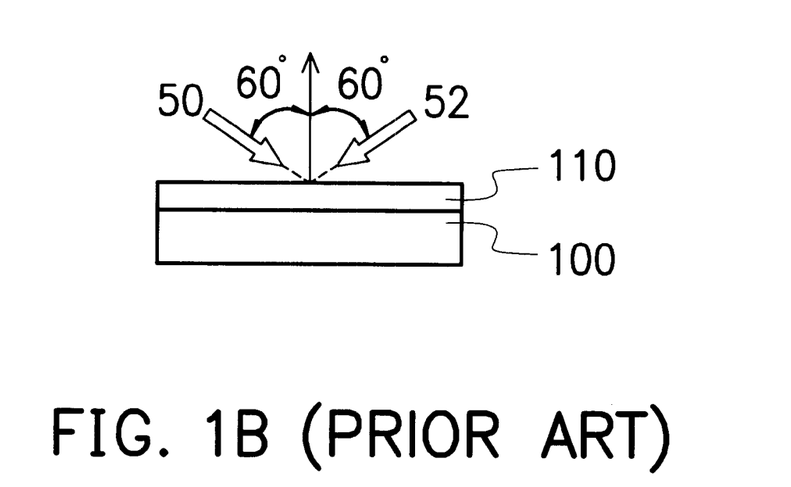
FIG. 1B is a side view, schematically a typical relation between the view angle and the LCD with respect to FIG. 1A.

For a LCD, particularly to a TFT-LCD, the vision quality for images or words may change from different view direction. If the view angle is too large, the vision quality, such as the illumination contrast ratio, is degraded. A wide view technology is always important to improve the vision quality of the TFT LCD, in which a wide view film is the most efficient way in the wide view technology to improve the vision quality. FIG. 1A is a top view, schematically illustrating a relation between the LCD and the view angle. FIG. 1B is a side view, schematically illustrating the relation between the view angle and the LCD in FIG. 1A. A wide view film 110 is put on a LCD device 100. The images on the LCD device can be viewed from a left 50, right 52, up 56, and down 54. The current wide view film 110 allows the image to be viewed by a view angle of 60 degrees, and the contrast ratio (CR) at that angle is about CR=10. The up view angle is about 30 degrees and the lower view angle is about 60 degrees. In this range of view angle, it is still insufficient.

In the LCD, the liquid crystal means a material of which the material structure is between a crystal and a liquid. When the liquid crystal material is applied with an external electric field, the liquid crystal molecules are affected by the electric field and the alignment structure of the liquid crystal molecules are changed. Due to the difference of liquid crystal alignment, the polarization direction of passing light is rotated. By making use of these properties, the liquid crystal material can be used as a displaying device. Since the LCD has various advantages of small weight, small thickness, low driving voltage, small volume, and low power consumption, LCD has wide applications. However, how to improve the vision quality is an essential issue to continuously develop.

Figure 2:
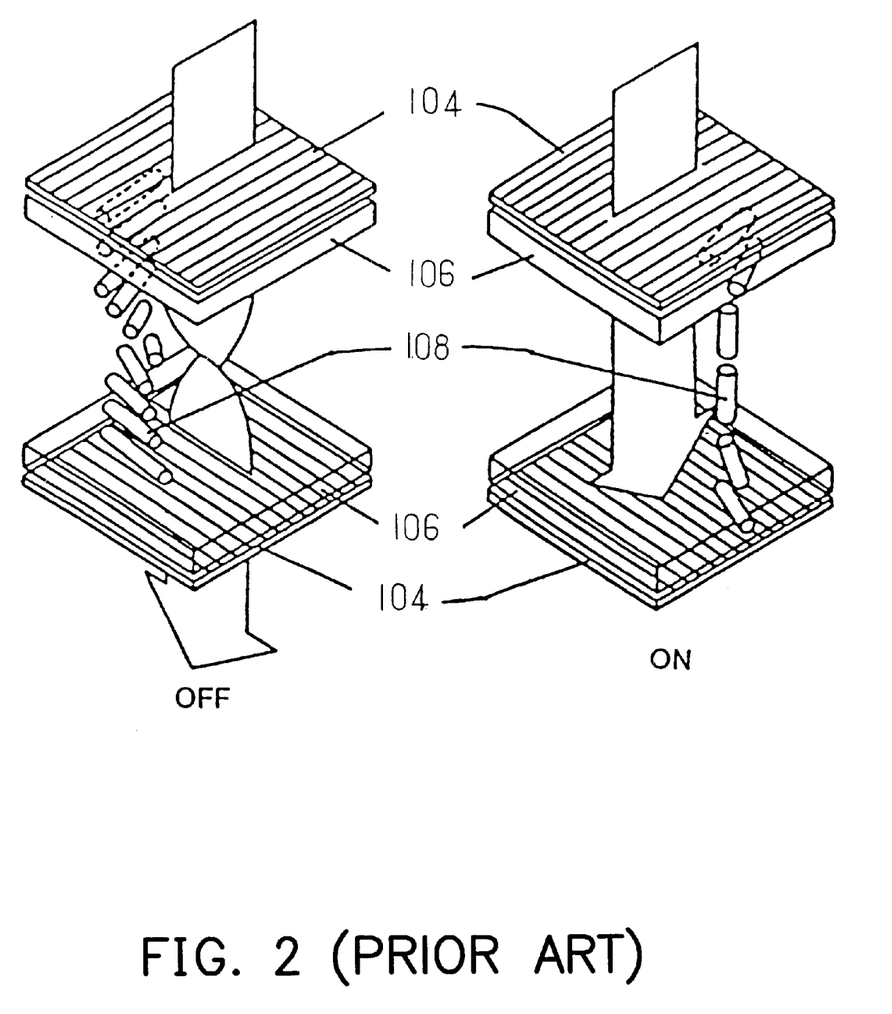
FIG. 2 is a drawing, schematically illustrating the working principle of a LCD.

The working principle of the LCD is schematically shown in FIG. 2. In FIG. 2, theory of a twisted nematic (TN) LCD is, for example, shown. A liquid crystal layer 108 is confined between a glass plate 106. A polarizing layer 104 is arranged on the outer side of the glass plate 106 at the both sides, but the polarization direction is vertical to each other. For the left situation in FIG. 2, the incident light is polarized into one direction after the light travels the polarizing plate 104. The polarized incident light then enters the liquid crystal layer 108. When the liquid crystal layer 108 is not applied with a bias, the liquid crystal molecules are twisted by 90 degrees from one side to the other side. Since the polarizing plates 104 for the two sides have vertical polarization direction, the incident light can pass the lower polarizing plate 104.

If the liquid crystal layer 108 is applied with bias, such as the right situation in FIG. 2, the liquid crystal molecules is changed to a line structure. In this manner, the polarization direction of the incident light does not change. Due to the lower polarizing plate 104 has the 90 degree shift to the upper polarizing plate 104, the incident light can not pass the lower polarizing plate when the liquid crystal material is applied with bias.

A TFT LCD typically include a TFT matrix to form the image pixel. The TFT's are formed by semiconductor technology to form a TFT matrix with respect to the desired pixel matrix. By controlling the bias produced by the TFT, the bias of TFT can control the TN LCD to decide whether the light can travel through or not. In the foregoing, the working principle of the TFT LCD is described. If the displaying image is a color image, the color effect can also by achieved by control of the applied bias. These technology is well known by the skilled artisans. No further description is made here.

For a LCD, the upper polarizer and the lower polarizer with polarization directions vertical to each other are necessary. However, when the light travels through the polarizer, an additional phase angle usually produces. This causes an optical leakage, and consequently causes the poor contrast ratio at the wide angle. Since the wide view technology is the essential method for the TFT LCD to have better image quality, the wide view quality is the key factor to decide whether the wide view technology is successful or not.

Figure 3:
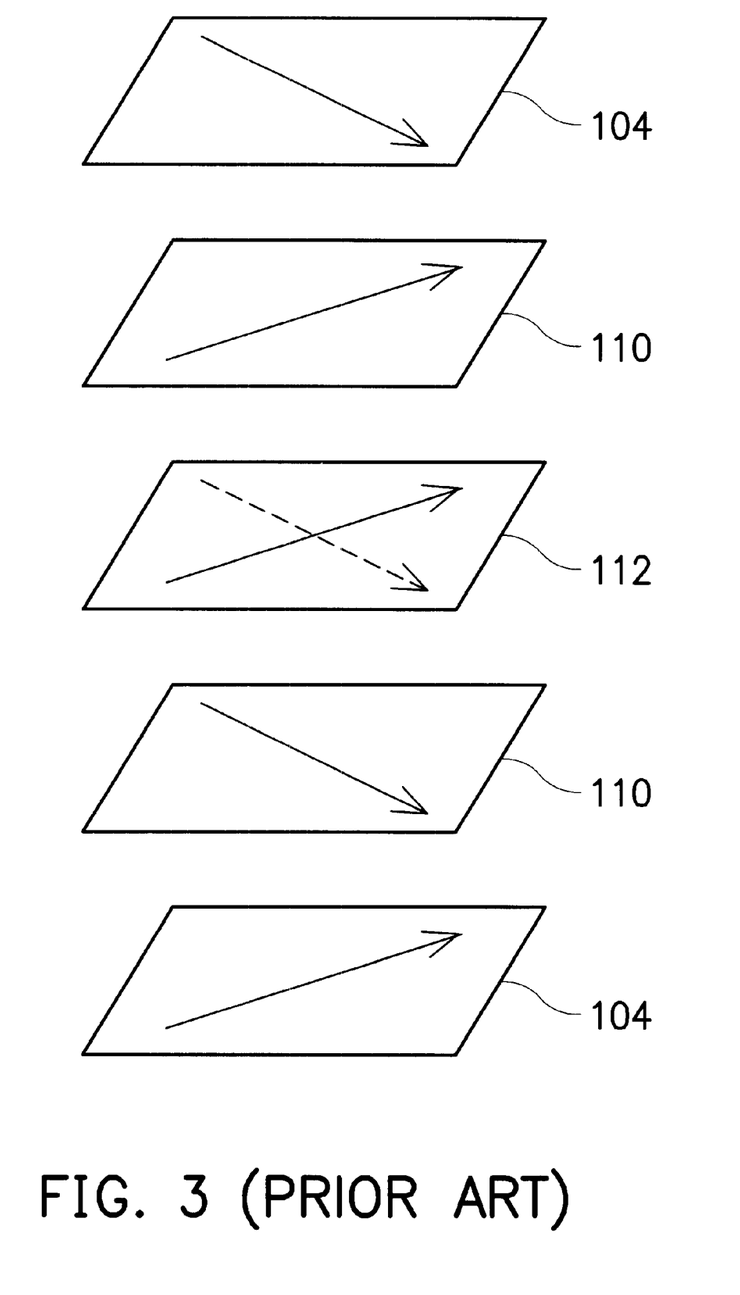
FIG. 3 is a drawing, schematically illustrating a conventional LCD structure.

FIG. 3 is a drawing, schematically illustrating a conventional structure of a LCD. In FIG. 3, a liquid crystal layer 112 is located at the middle. The arrows on the liquid crystal layer 112 is the rubbing direction of a glass substrate, that is, the aligning direction of the liquid crystal molecules. On both sides of the liquid crystal layer 112, each side has a wide view (WV) film 110 and a polarizer 104. The arrow directions on the polarizers 104 are the polarizing directions. As shown in FIG. 3, the polarization directions on the polarizers 104 are vertical to each other. The principle directions of the WV films 110 are also vertical to each other.

As the light travels through the upper polarizer 104, only the light component polarized at 45 degrees can transmit through the upper polarizer 104. Under proper control of bias on the liquid crystal layer 112, polarization of the light is rotated to match to the lower polarizer 104. Then, the light passes. Usually, a polarizer always has additional phase deviation from polarization direction, causing optical leakage, and consequently causing the poor quality of the image.

Figure 5:
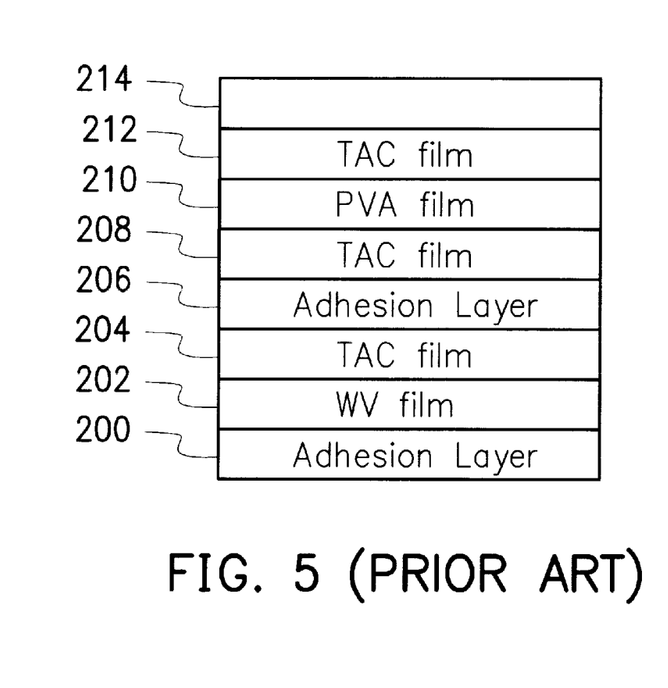
FIG. 5 is a drawing, schematically illustrating a conventional WV structure.

FIG. 5 also shows a structure of WV device, which is fabricated by a manner known as a TAC less technology. In FIG. 5, the WV structure includes a first adhesion layer 200. On the adhesion layer 200, it sequentially has a WV film 202, a first TAC substrate 204, a second adhesion layer 206, a second TAC substrate 208, a PVS polarization base film 210, a third TAC substrate 212, and a protection film 214. This is a conventional WV structure. There is no a retardation phase plate. The PVA polarization base film 210 can also serve as a polarizer with polarization direction.

SUMMARY OF THE INVENTION

The invention provides a structure of LCD, of which a retardation phase plate is included at the front side or back side of the WV film, so as to delay the polarized light transmitting from the polarizer. Thereby, optical leakage is effectively reduced, and the contrast ratio is effectively increased.

The invention provides a structure of LCD, the structure of LCD included a first polarizer with a first polarization direction along a first angle. A first retardation phase plate is located behind the first polarizer. The first retardation phase plate is used to produce a retardation effect. The retardation direction is the same as the first angle. A first WV film is behind the first retardation phase plate. The WV film is operated along a second angle vertical to the first angle. A liquid crystal layer is located behind the WV film 110. The crystal rubbing direction of the liquid crystal layer is along the second direction. A second WV film is behind the liquid crystal layer. The second WV film is operated along the first angle. A second retardation phase plate is located behind the second WV film. The retardation direction of the second retardation phase plate is along the second angle. A second polarizer is located behind the second retardation phase plate. The polarization direction of the second polarizer is along the second angle.

In the foregoing, two retardation phase plates are used. However, in general, only one retardation phase plate is also sufficient. The condition is that the slow axis of the retardation phase plate is parallel the polarization direction of the passing light.

Moreover, the retardation phase plate can also be located between the WV film and the liquid crystal layer instead.

The invention also provide a WV device, which includes a first adhesion plate. A first WV film is located on the first adhesion plate. A first TAC plate is located on the WV film. A second adhesion plate is located on the first TAC plate. A retardation phase plate is located on the second adhesion plate. A PVA polarization base film is located on the retardation phase plate. A second TAC plate is located on the PVA polarization base film. A protection film is located on the second TAC plate.

In the foregoing, the WV device includes a retardation phase plate to replace the TAC plate in the conventional WV device. This can effectively reduce the fabrication cost and the total thickness of the WV device. In addition, the chromatic aberration of light is effectively reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The draws illustrate embodiments of the invention and, together with the description, serve to plain the principles of the invention. In the drawings.

DESCRIPTION OF THE PREFERRED EMBODIMENTS

The invention provides a display structure, including a retardation phase plate. The retardation phase plate can be located before the WV film or behind the WV film so as compensate an optical leakage due to the polarizer. In this manner, the image quality viewed at a wide angle still has sufficient contrast ratio (CR), where CR is at least about 50. Particularly, the quality from the upper view can be improved by at least 5–10 times.

The retardation phase plate can also replace one TAC plate in a conventional structure with multiple TAC plates. This can effectively reduce the fabrication cost and the total thickness of the WV device. In addition, the chromatic aberration of light is effectively reduced. A preferred embodiment is provided in the following for descriptions.

Figure 4A:
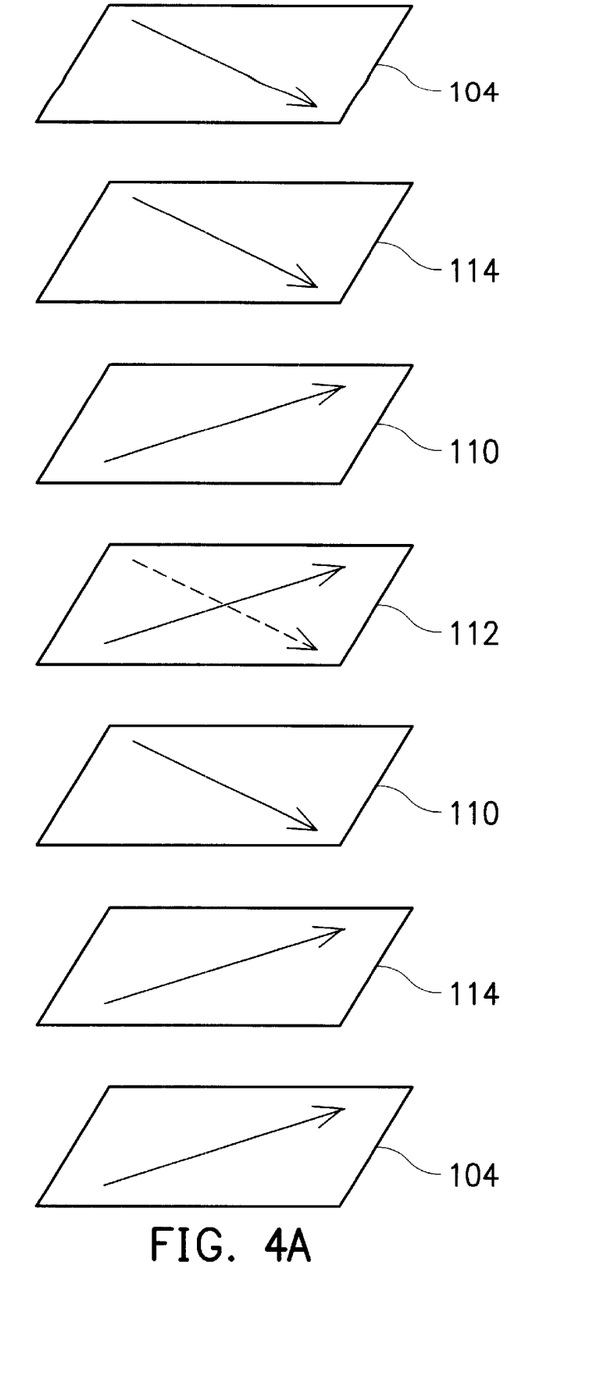
FIG. 4A is a drawing, schematically illustrating an A-type LCD structure, according to a preferred embodiment of the invention.

FIG. 4A is a drawing, schematically illustrating an A-type LCD structure, according to a preferred embodiment of the invention. In FIG. 4A, in order to solve the optical leakage due to the polarizer, a retardation phase plate 114 is added between the polarizer 104 and the WV film 110. This is called an A-type LCD. The physical structure of the retardation phase plate is a type of birefringence with a long axis and a short axis. Since the refraction index along the long axis is larger, the light travelling speed is slower, the long axis is also called a slow axis while the short axis is also called a fast axis. The retardation phase plate 114 has the slow axis arrange to lie on the retardation phase plate.

The structure of the WV film associating with the retardation phase plate is in the following. An upper polarizer 104 having a first polarization direction, such as a 45 degree polarization. An upper retardation phase plate 114 is located behind the upper polarizer 104. The slow axis on the retardation phase plate 114 is along a first direction, which is the same as the first polarization direction. An upper WV film 110 is located behind the retardation phase plate 114. The principle direction of the upper WV film 110 is indicated by the arrow, along a second direction. The first direction is vertical to the second direction. The operation of the WV film is known by the skilled artisans, no descriptions in detail is provided here. A liquid crystal layer 112 is located behind the upper WV film 110. The crystal rubbing direction is along the second direction as indicated by arrow. A lower WV film 110 is located behind the liquid crystal layer 112. The lower WV film 110 is operated at the first direction as indicated by arrow. A lower retardation phase plate 114 is located behind the lower WV film 110. The slow axis on the retardation phase plate 114 is pointing to the second direction. A lower polarizer 104 is located behind the lower retardation phase plate. The polarization direction of the lower polarizer 104 is pointed to the second direction.

In the fore going, two retardation phase plates 114 are used in design. In this design, the structure with respect to the liquid crystal layer 112 is symmetric, so that the left and right views has symmetric effects. However, the fabrication cost is relatively high and the volume may be also relatively large. Alternatively, the design can include only one retardation phase plate 114. In single side design, the left and right symmetric effects is relatively poor. No matter whether the design includes two retardation phase plate or single retardation phase plate, the retardation phase plate always has effects to improve the image quality.

The retardation phase plate is a birefringence crystal, where the long (slow) axis ne and the short (fast) axis no, and the thickness may affect the retardation effect. Usually, $\Delta$nd is a parameter to indicate the property of the retardation phase plate. $\Delta$n=ne−no, the thickness is d. For the A-type design, the product of $\Delta$nd is about 20–300 nm.

Figure 4B:
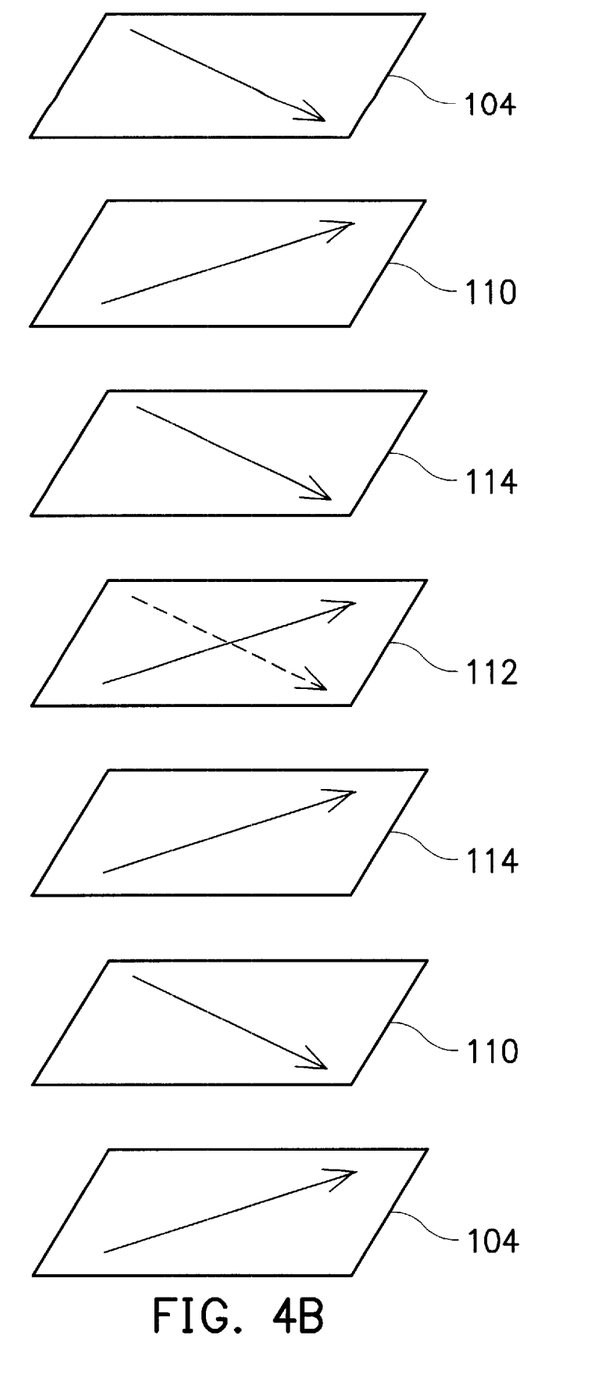
FIG. 4B is a drawing, schematically illustrating a B-type LCD structure, according to a preferred embodiment of the invention.

Moreover, the retardation phase plate can also be put between the WV film 110 and the liquid crystal layer 112, that is, a B-type as shown in FIG. 4B. The design can take wither double side design for the retardation phase plate or the single side design.

For the B-type, the quantity of $\Delta$nd is about 20–100 nm or 400–600 nm.

According to the practical design and the experiment results, the invention can effectively improve the CR quantity by at least factor of 5–10. For example, for a long axis of ne=0.51 and the short axis of no=0.50, $\Delta$n is 0.01. The bias of the operation parameters usually is less than 10V, which also depends on the actual liquid crystal material in use. For the A-type and B-type and the single side design for the retardation phase plate, the results are shown in following table. The thickness of the retardation phase plate usually is less than 100 microns, which thickness also depends on the quantity of $\Delta$n in the A-type or B-type design.

| | View Angle (degree) (CR > 10) | | | |
| --- | --- | --- | --- | --- |
| | left | Right | up | down |
| WV film (without retardation phase plate | 60 | 60 | 40 | 60 |
| A-type | >80 | >80 | 50 | 45 |
| B-type | >80 | >80 | 35 | 75 |

In the table, the invention using the retardation phase plate has effectively improved the image quality at the wide angle. The CR quantity is effectively improved.

Figure 6:
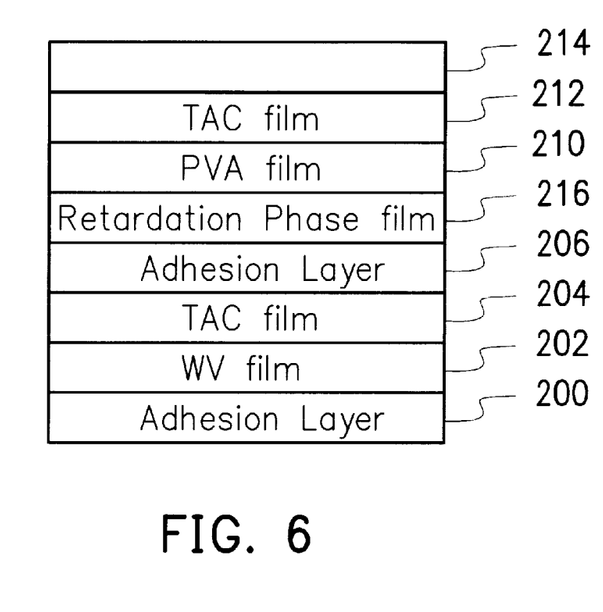
FIG. 6 is a drawing, schematically illustrating a WV structure, according to a preferred embodiment of the invention.

Furthermore, the retardation phase plate introduced in the invention not only can improve CR quantity but also can replace a TAC plate in fabrication of a WV device. As shown in FIG. 5, the conventional WV device includes multiple TAC plate as polarization substrate. One of the TAC plate can be replaced by a retardation phase late. As shown in FIG. 6, the retardation phase plate 216 replace the TAC plate 208 in FIG. 5. In this manner, the invention can effectively reduce the fabrication cost and the total thickness of the WV device. In addition, the chromatic aberration of light is effectively reduced. In FIG. 6, the PVA polarization base film can also serve as a polarizer, which then is equivalent to the A-type design.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A liquid crystal display (LCD) structure, comprising:
a first polarizer, having a polarization direction on a first angle;
a first wide view (WV) film located behind the first polarizer, wherein the first WV film is along a second angle, and the second angle shifts from the first angle by 90 degrees;
a liquid crystal layer located behind the first WV film, wherein a crystal rubbing direction is along the second angle;
a second WV film located behind the liquid crystal layer, wherein the second WV is arranged along the first angle;
a second polarizer located behind the second WV film, wherein the second polarizer has a polarization direction along the second angle; and
a first retardation phase plate disposed between the first polarizer and the first WV film, and a second retardation phase plate disposed between the second polarizer and the second WV film, wherein the first retardation phase plate is used to produce a retardation effect of phase by positioning a slow axis along the first angle, and the second retardation phase plate is used to produce a retardation effect by positioning a slow axis along a direction matching to the polarization direction of the second polarizer, and wherein the first retardation phase plate and the second retardation phase plate have $\Delta$nd of 201–300 nm, where $\Delta$n is a difference of a fast axis and the slow axis, and d is a thickness of the first retardation phase plate.

2. A liquid crystal display (LCD) structure, comprising:
a first polarizer, having a polarization direction on a first angle;
a first wide view (WV) film located behind the first polarizer, wherein the first WV film is along a second angle, and the second angle shifts from the first angle by 90 degrees;
a liquid crystal layer located behind the first WV film, wherein a crystal rubbing direction is along the second angle;
a second WV film located behind the liquid crystal layer, wherein the second WV is arranged along the first angle;
a second polarizer located behind the second WV film, wherein the second polarizer has a polarization direction along the second angle; and
a first retardation phase plate disposed at a position between the first WV film and the liquid crystal layer, wherein the first retardation phase plate is used to produce a retardation effect of phase by positioning a slow axis along the first angle, and wherein the first retardation phase plate has $\Delta$nd of 401–600 nm, where $\Delta$n is a difference of a fast axis and the slow axis, and d is a thickness of the first retardation phase plate.

3. The LCD structure of claim 2, further comprising a second retardation phase plate, wherein the first retardation phase plate is located between the first WV film and the liquid crystal layer, and the second retardation phase plate is located between the second WV film and the liquid crystal layer.

4. The LCD structure of claim 3, wherein the second retardation phase plate has Δnd of one selected from the group consisting of 20–100 nm and 401–600 nm, where Δn is a difference of a fast axis and the slow axis, and d is a thickness of the second retardation phase plate.

5. A liquid crystal display (LCD) structure, comprising:
   a first polarizer, having a polarization direction on a first angle;
   a wide view (WV) film located behind the first polarizer, wherein the WV film is operated along a second angle, and the second angle shifts from the firs angle by 90 degrees;
   a liquid crystal layer located behind the WV film, wherein a crystal rubbing direction is along the second angle;
   a second polarizer located behind the liquid crystal layer, having a polarization direction on the second angle;
   a retardation phase plate disposed at a position either between the first polarizer and the WV film, wherein the retardation phase plate is used to produce a retardation effect by positioning a slow axis the first angle or between the second polarizer and the liquid crystal layer, wherein the retardation phase plate is used to produce a retardation effect of phase by positioning a slow axis along the second angle, and wherein the retardation phase plate has Δnd of 401–600 nm, where Δn is a difference of a fast axis and the slow axis, and d is a thickness of the retardation phase plate.

* * * * *